United States Patent
Christiansen et al.

(10) Patent No.: US 6,369,969 B1
(45) Date of Patent: Apr. 9, 2002

(54) DISK DRIVE FOR DETECTING A POLARITY ERROR OF A MAGNETORESISTIVE HEAD BY DETECTING A SYNC MARK

(75) Inventors: Grant S. Christiansen; Mark D. Hagen, both of Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/797,446

(22) Filed: Feb. 28, 2001

(51) Int. Cl.[7] .................................................. G11B 5/09
(52) U.S. Cl. ........................... 360/66; 360/51; 360/59; 369/53.3
(58) Field of Search .................... 360/45, 48, 51, 360/59, 66, 313, 316, 328; 369/53.3, 59.17, 110.01

(56) References Cited

U.S. PATENT DOCUMENTS

| | | | |
|---|---|---|---|
| 5,477,103 A | | 12/1995 | Romano et al. |
| 5,541,960 A | | 7/1996 | Satomura et al. |
| 5,608,583 A | | 3/1997 | Shrinkle |
| 5,682,274 A | * | 10/1997 | Brown et al. ............. 360/77.04 |
| 5,754,353 A | * | 5/1998 | Behrens et al. ................ 360/53 |
| 5,771,127 A | * | 6/1998 | Reed et al. .................... 360/51 |
| 5,793,548 A | | 8/1998 | Zook |
| 5,796,535 A | * | 8/1998 | Tuttle et al. ................... 360/51 |
| 5,798,885 A | | 8/1998 | Saiki et al. |
| 5,862,005 A | * | 1/1999 | Leis et al. ..................... 360/27 |
| 5,917,680 A | * | 6/1999 | Valstyn et al. .............. 360/113 |
| 6,023,386 A | * | 2/2000 | Reed et al. .................... 360/51 |
| 6,031,672 A | | 2/2000 | Bergquist et al. |
| 6,043,947 A | * | 3/2000 | Gooch et al. .................. 360/66 |
| 6,108,153 A | | 8/2000 | Glover |
| 6,157,604 A | * | 12/2000 | Feyh et al. .................... 369/59 |

* cited by examiner

*Primary Examiner*—Robert S. Tupper
*Assistant Examiner*—Dzung C Nguyen
(74) *Attorney, Agent, or Firm*—Milad G Shara

(57) ABSTRACT

A disk drive is disclosed comprising a bias layer in a magnetoresistive (MR) head actuated over a disk having a plurality of data tracks, each data track comprising a plurality of sectors. A sync mark detector detects a sync mark pattern in a sector, wherein when the sync mark pattern is detected a sync mark detect signal and a polarity signal are generated. The polarity signal indicates when the polarity of the bias layer has deviated from a preferred polarity, wherein the polarity of the bias layer is realigned back toward the preferred polarity.

6 Claims, 7 Drawing Sheets

DISK DRIVE FOR DETECTING A POLARITY ERROR OF A MAGNETORESISTIVE HEAD BY DETECTING A SYNC MARK

BACKGROUND OF THE INVENTION

1. Field of the Invention

The present invention relates to disk drives for computer systems. More particularly, the present invention relates to a disk drive for detecting a polarity error of a magnetoresistive head by detecting a sync mark.

2. Description of the Prior Art

FIG. 1 shows a prior art format of a disk 2 employed in a disk drive of a computer system. The disk 2 comprises a plurality of radially-spaced, concentric tracks 4 which are partitioned into a plurality of data sectors. The disk 2 further comprises a plurality of embedded servo sectors 6 for use in servoing a head over the desired track during write and read operations. A sector (data or servo) typically comprises a preamble field 8 for synchronizing timing recovery and gain control within a read channel, and a sync mark 10 for symbol synchronizing to a data field 12. Data stored in an embedded servo sector 6 may include a track address which provides coarse head positioning information to a servo control system. An embedded servo sector 6 also typically comprises a plurality of servo bursts 14 recorded at precise offsets from a track's centerline to provide fine head positioning information to the servo control system.

Magnetoresistive (MR) heads (including the Giant Magnetoresistive (GMR) and spin valve MR heads) are typically employed in disk drives due to the increase in sensitivity as compared to a conventional inductive head. An MR head comprises an inductive write element (coil) and a MR read element which has a resistance inversely proportional to the strength of the magnetic field created by the magnetic flux transitions recorded on the disk. The MR read element typically comprises a bias layer that is magnetized according to a particular orientation or polarity. It is possible for the bias layer to deviate from its preferred polarity due, for example, to the magnetic field induced by the write element or the magnetic field emanating from the disk, particularly in the presence of a thermal asperity.

When the bias layer of the MR head deviates from its preferred polarity, the sensitivity of the MR read element is greatly reduced. It is therefore desirable to detect when the bias layer of an MR head has deviated from the preferred polarity, and to realign the polarity of the bias layer toward its preferred orientation.

SUMMARY OF THE INVENTION

The present invention may be regarded as a disk drive comprising a disk having a plurality of data tracks, each data track comprising a plurality of sectors. Each sector comprises a preamble field for storing a predetermined periodic data sequence, a sync field for storing a predetermined sync mark pattern, and a data field for storing data. A magnetoresistive (MR) head comprising a MR read element having a bias layer magnetizable toward a preferred polarity is actuated radially over the disk for generating a read signal. A sync mark detector detects the sync mark pattern in the read signal, wherein when the sync mark pattern is detected the sync mark detector generates a sync mark detect signal and a polarity signal. The polarity signal is indicative of a polarity of the bias layer. When the polarity signal indicates the polarity of the bias layer has deviated from the preferred polarity, the polarity of the bias layer is modified.

In one embodiment the sync mark detector comprises a matched filter and a dual polarity correlator. In one embodiment the polarity of the bias layer is modified by increasing a bias current applied to the bias layer for a predetermined interval.

The present invention may also be regarded as a method of compensating for a polarity error of a bias layer in a magnetoresistive (MR) head deployed in a disk drive. The disk drive comprises a disk having a plurality of data tracks, wherein each data track comprises a plurality of sectors. Each sector comprises a preamble field for storing a predetermined periodic data sequence, a sync field for storing a predetermined sync mark pattern, and a data field for storing the data. The method comprises the steps of detecting the sync mark pattern in the read signal generated by the MR head, and when the sync mark pattern is detected, generating a sync mark detect signal and a polarity signal. The polarity signal is indicative of a polarity of the bias layer. When the polarity signal indicates the polarity of the bias layer has deviated from the preferred polarity, the polarity of the bias layer is modified.

DESCRIPTION OF THE PREFERRED EMBODIMENTS

Figure 1:
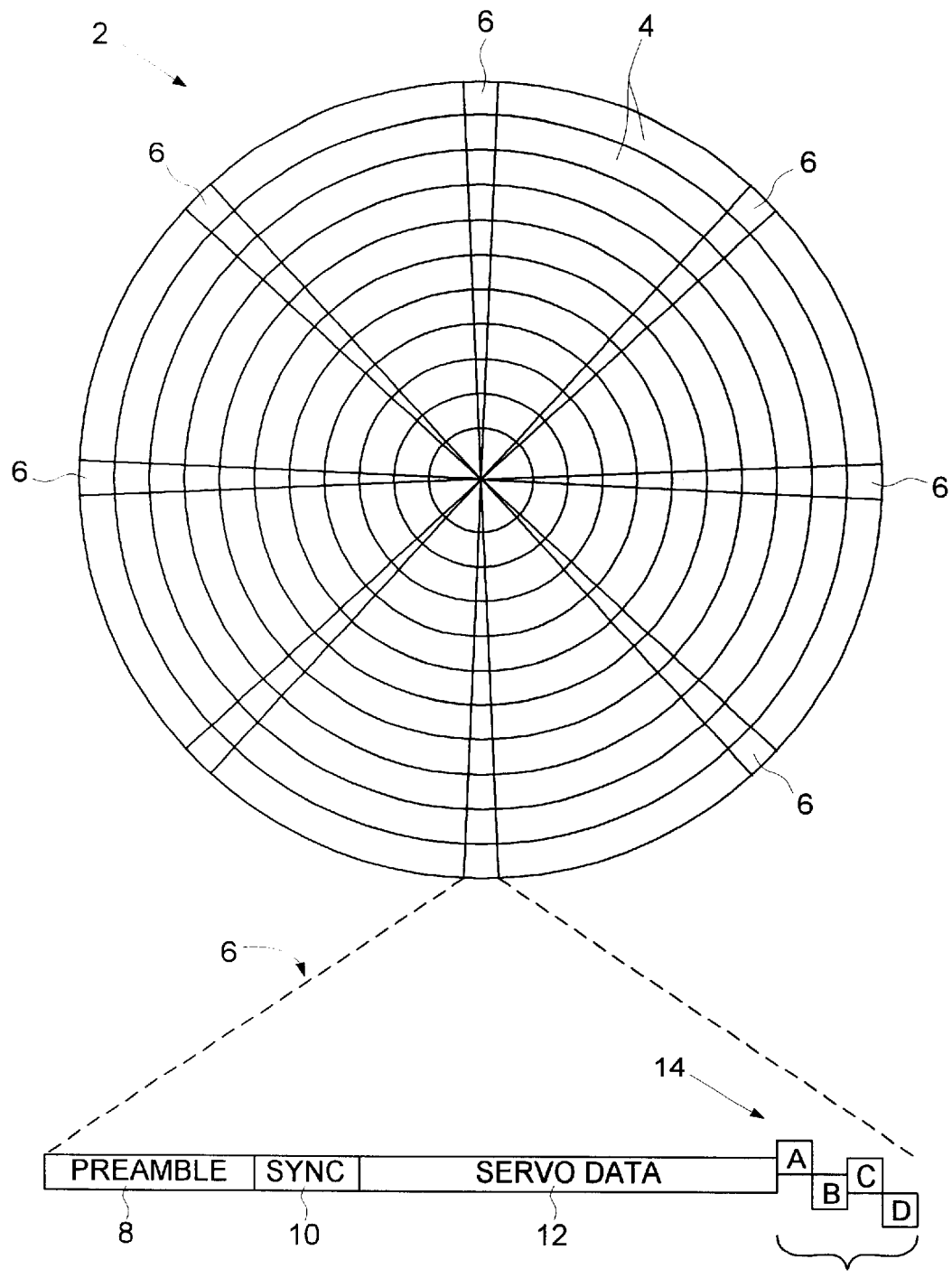
FIG. 1 shows a prior art format of a disk comprising a plurality of tracks partitioned into a plurality of sectors, and a plurality of embedded servo sectors, wherein each sector comprises a preamble field for storing a predetermined periodic data sequence, a sync field for storing a predetermined sync mark pattern, and a data field for storing data.
Figure 2:
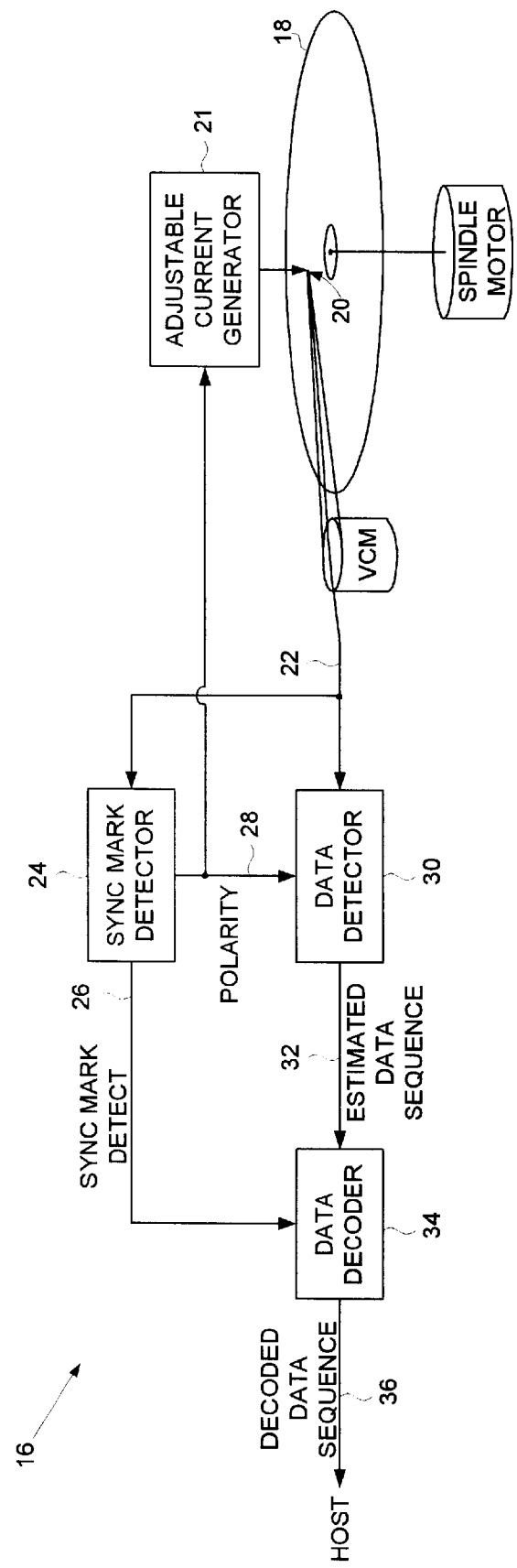
FIG. 2 shows a disk drive according to an embodiment of the present invention as comprising a sync mark detector for detecting a sync mark pattern in the read signal, a data detector for detecting an estimated data sequence from the read signal using a polarity signal generated by the sync mark detector, and a data decoder for decoding the estimated data sequence in response to a sync mark detect signal.

FIG. 2 shows a disk drive 16 according to an embodiment of the present invention as comprising a disk 18 having a plurality of data tracks, each data track comprising a plurality of sectors. Each sector comprises a preamble field for storing a predetermined periodic data sequence, a sync field for storing a predetermined sync mark pattern, and a data field for storing data. A magnetoresistive (MR) head 20 comprising a MR read element having a bias layer magnetizable toward a preferred polarity is actuated radially over the disk 18 for generating a read signal 22. A sync mark detector 24 detects the sync mark pattern in the read signal 22, wherein when the sync mark pattern is detected the sync mark detector 24 generates a sync mark detect signal 26 and a polarity signal 28. The polarity signal 28 is indicative of a polarity of the bias layer. When the polarity signal indicates the polarity of the bias layer has deviated from the preferred polarity, the polarity of the bias layer is modified.

In the embodiment of FIG. 2, the disk drive 16 comprises a data detector 30 for detecting an estimated data sequence 32 from the read signal 22 using the polarity signal 28 to enhance performance, and a data decoder 34 for decoding the estimated data sequence 32 into a decoded data sequence 36 in response to the sync mark detect signal 26. Any suitable data decoder 34 may be employed. In one embodiment, the data decoder 34 implements a run-length limited (RLL) code, and in another embodiment the data decoder 34 implements an error correction code (ECC) such as the well known Reed-Solomon code. In order to decode the estimated data sequence 32 generated by the data detector 30, the data decoder 34 utilizes the sync mark detect signal 26 to discern the symbol boundaries within the estimated data sequence 32.

Figure 3A:
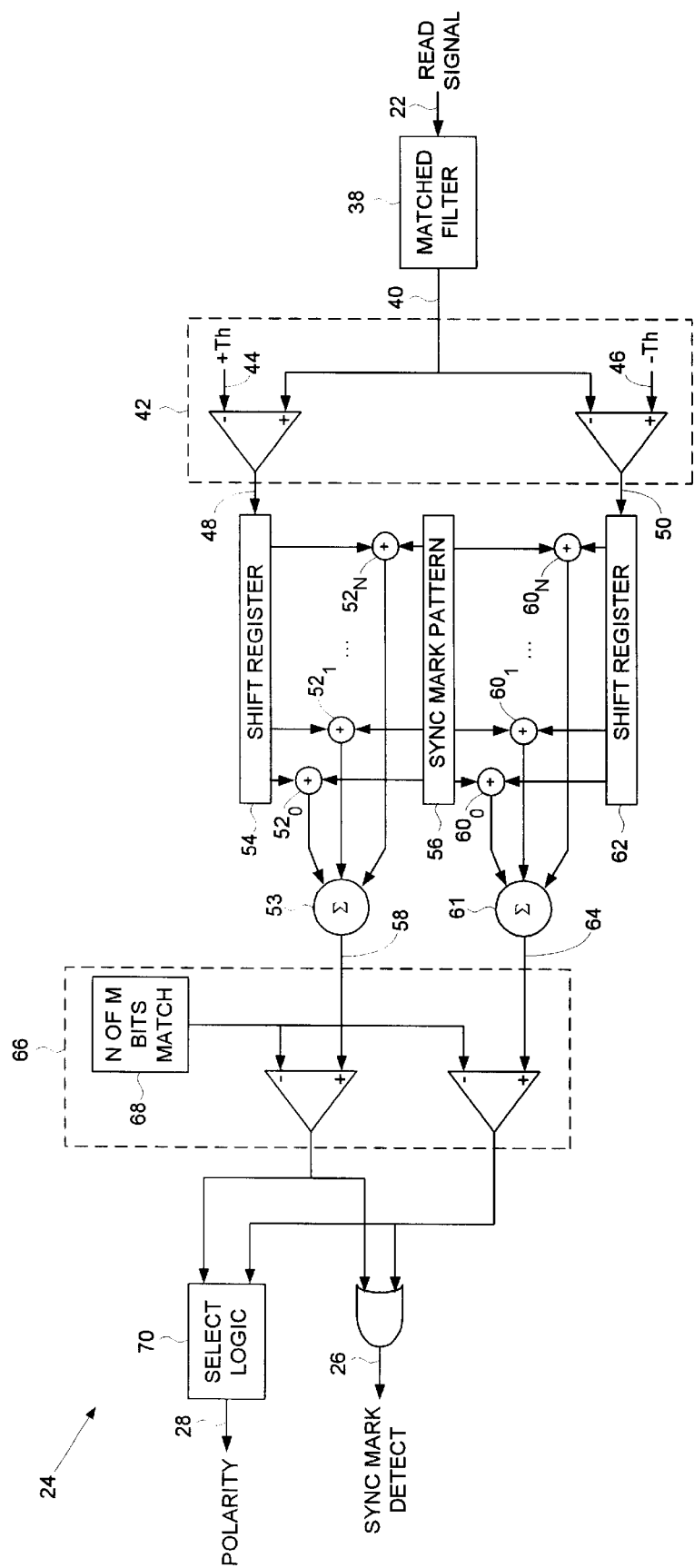
FIG. 3A shows a sync mark detector according to an embodiment of the present invention as comprising a matched filter and a dual polarity correlator.

Any suitable sync mark detector 24 may be employed to detect the sync mark pattern in the read signal 22 and generate the polarity signal 28. FIG. 3A shows details of a sync mark detector 24 according to an embodiment of the present invention. In this embodiment, the sync mark pattern of a sector is recorded on the disk 18 in a binary sequence. A "1" bit in the binary sequence is represented by a dibit recorded on the disk 18, the dibit generating a dibit response in the read signal 22, and a "0" bit in the binary sequence is represented by the absence of a dibit recorded on the disk 18. The sync mark detector 24 of FIG. 3A comprises a matched filter 38 having an impulse response substantially matched to the dibit response. The matched filter 38 filters the read signal 22 to generate a filtered signal 40. A first threshold detector 42 compares the filtered signal 40 to a positive threshold 44 and to a negative threshold 46. The first threshold detector 42 outputs a first estimated sequence 48 corresponding to the positive threshold 44, and outputs a second estimated sequence 50 corresponding to the negative threshold 46. A "1" bit is detected in the first estimated sequence 48 when the filtered signal 40 exceeds the positive threshold 44 and a "0" bit is detected in the first estimated sequence 48 when the filtered signal 40 does not exceed the positive threshold 44. A "1" bit is detected in the second estimated sequence 50 when the filtered signal 40 exceeds the negative threshold 46 and a "0" bit is detected in the second estimated sequence 50 when the filtered signal 40 does not exceed the negative threshold 46. A first plurality of correlators (XOR circuits $52_0$–$52_N$) correlate the bits of the first estimated sequence 48 (stored in shift register 54) with the bits of the predetermined sync mark pattern (stored in register 56). The outputs of the XOR circuits $52_0$–$52_N$ are summed by summing circuit 53 to generate a first correlated signal 58. A second plurality of correlators (XOR circuits $60_0$–$60_N$) correlate the bits of the second estimated sequence 50 (stored in shift register 62) with the bits of the predetermined sync mark pattern (stored in register 56). The outputs of the XOR circuits $60_0$–$60_N$ are summed by summing circuit 61 to generate a second correlated signal 64. The correlation of the first and second estimated data sequences 48 and 50 with the sync mark pattern 56 is performed with each new bit detected by the matched filter 38. A second threshold comparator 66 compares the first and second correlated signals 58 and 64 to a threshold 68 (wherein the threshold 68 is exceeded when N bits of either estimated sequence 48 or 50 match M bits of the sync mark pattern 56). The sync mark detect signal 26 is generated when either the first or second correlated signals 58 or 64 exceeds the threshold 68. The polarity signal 28 is generated relative to which correlated signal 58 or 64 exceeds the threshold 68 (as determined by select logic 70).

Figure 3B:
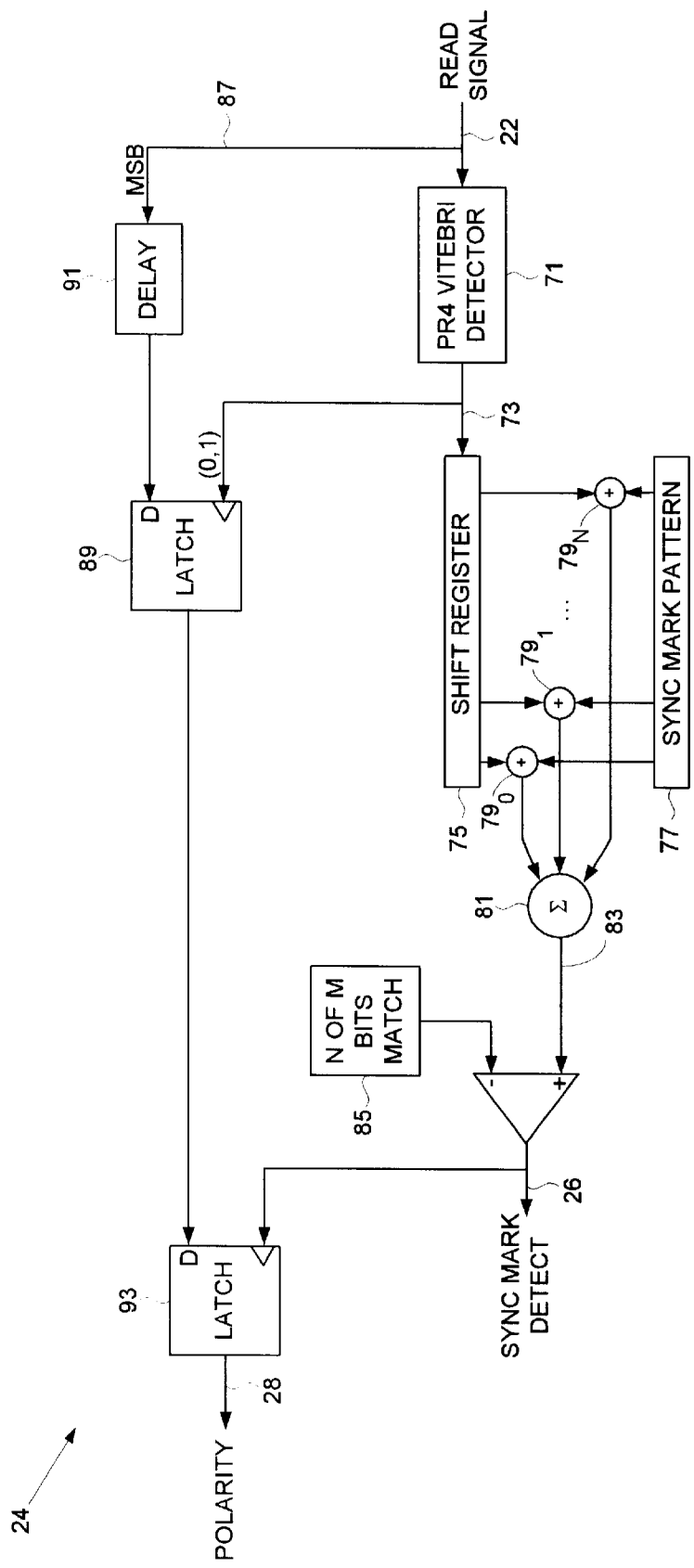
FIG. 3B shows a sync mark detector according to an alternative embodiment of the present invention as comprising a PR4 Viterbi detector and a latch for latching the sign bit (MSB) of the sample representing the last "1" bit in the sync mark pattern.

FIG. 3B shows a sync mark detector 24 according to an alternative embodiment of the present invention. In this embodiment, the sync mark pattern of a sector is recorded on the disk 18 in a binary sequence. The "1" bits in the binary sequence generate alternating +1 and –1 samples in the read signal 22 synchronous with the baud rate, and the "0" bits in the binary sequence generates 0 samples in the read signal 22 synchronous with the baud rate. A PR4 Viterbi detector 71 detects an estimated data sequence 73 from the read signal 22. The bits of the estimated data sequence 73 are shifted into shift register 75 and correlated with the bits of the sync mark pattern 77 using XOR circuits $79_0$–$79_N$. The outputs of XOR circuits $79_0$–$79_N$ are summed by summing circuit 81 to generate a correlated signal 83. The sync mark detect signal 26 is generated when the correlated signal 83 exceeds a threshold 85 (i.e., when N bits of the estimated data sequence 73 matches M bits of the sync mark pattern 77). The sign bit (MSB) 87 of the read signal 22 sample value is latched by latch circuit 89 with each "1" bit detected in the estimated data sequence 73. A delay circuit 91 compensates for the delay in the PR4 Viterbi detector 71. When the sync mark detect signal 26 is generated, a latch 93 latches the sign bit 87 of the read signal sample value corresponding to the last "1" bit detected in the estimated data sequence 73 representing the sync mark pattern. The output of latch 93 is the polarity signal 28 indicative of an expected polarity of the pulses in the read signal 22 representing the data stored in the data field following the sync mark.

Figure 4:
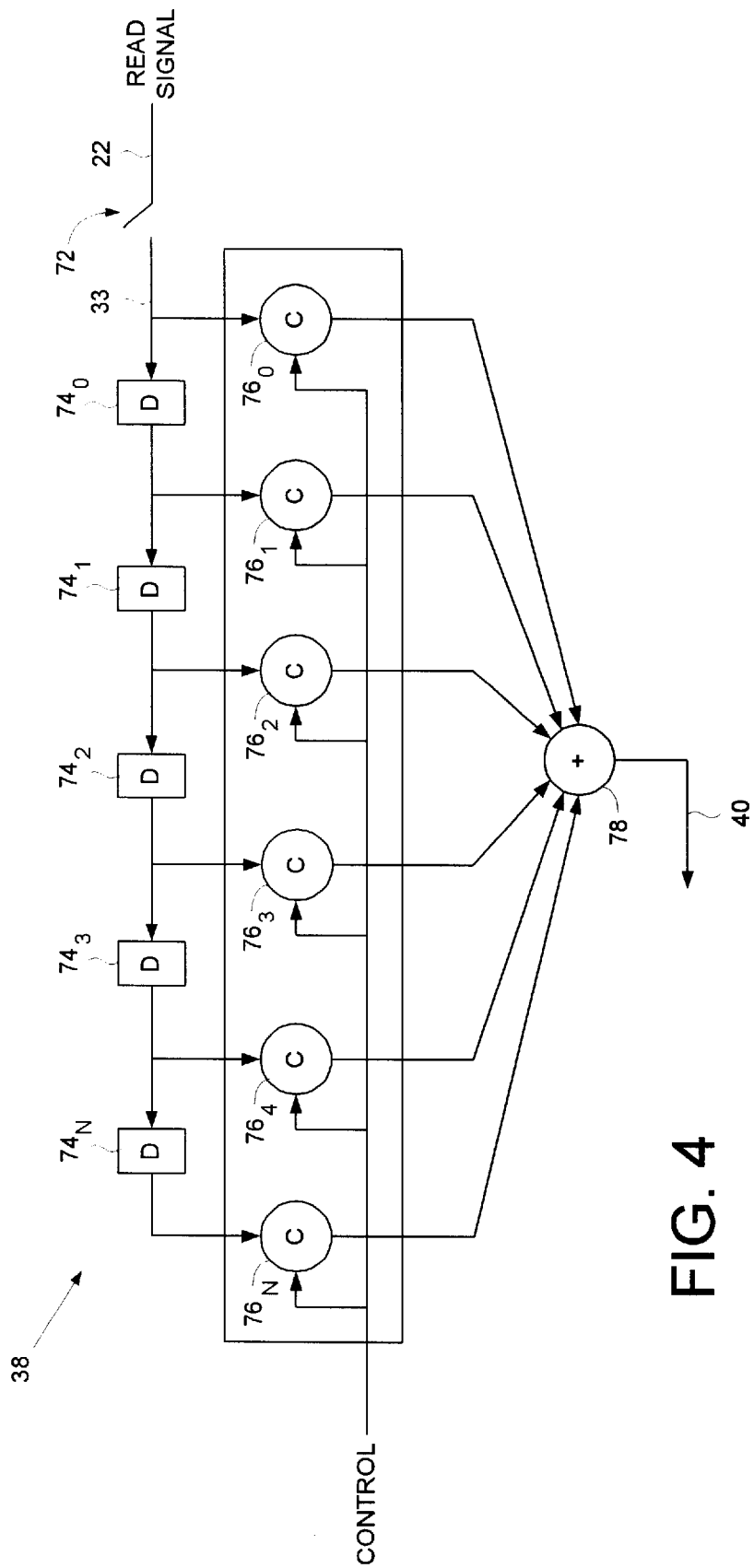
FIG. 4 shows details of a matched filter according to an embodiment of the present invention as comprising a plurality of discrete time delay elements, a plurality of programmable coefficients, and a summer.

FIG. 4 shows a matched filter 38 according to an embodiment of the present invention. The read signal 22 is sampled by a sampling device 72 (and optionally digitized). The read signal samples 73 are passed through a series of delay elements $74_0$–$74_N$, and multiplied by a plurality of coefficients $76_0$–$76_N$. The coefficients $76_0$–$76_N$ are selected such that the impulse response of the matched filter 38 substantially matches the dipulse response of the recording channel. In one embodiment, the coefficients $76_0$–$76_N$ are programmable so that the impulse response may be optimized relative to the dynamics of the recording channel. The results of the multiplications are summed at adder 78 to generate the filtered signal 40.

Figure 5:
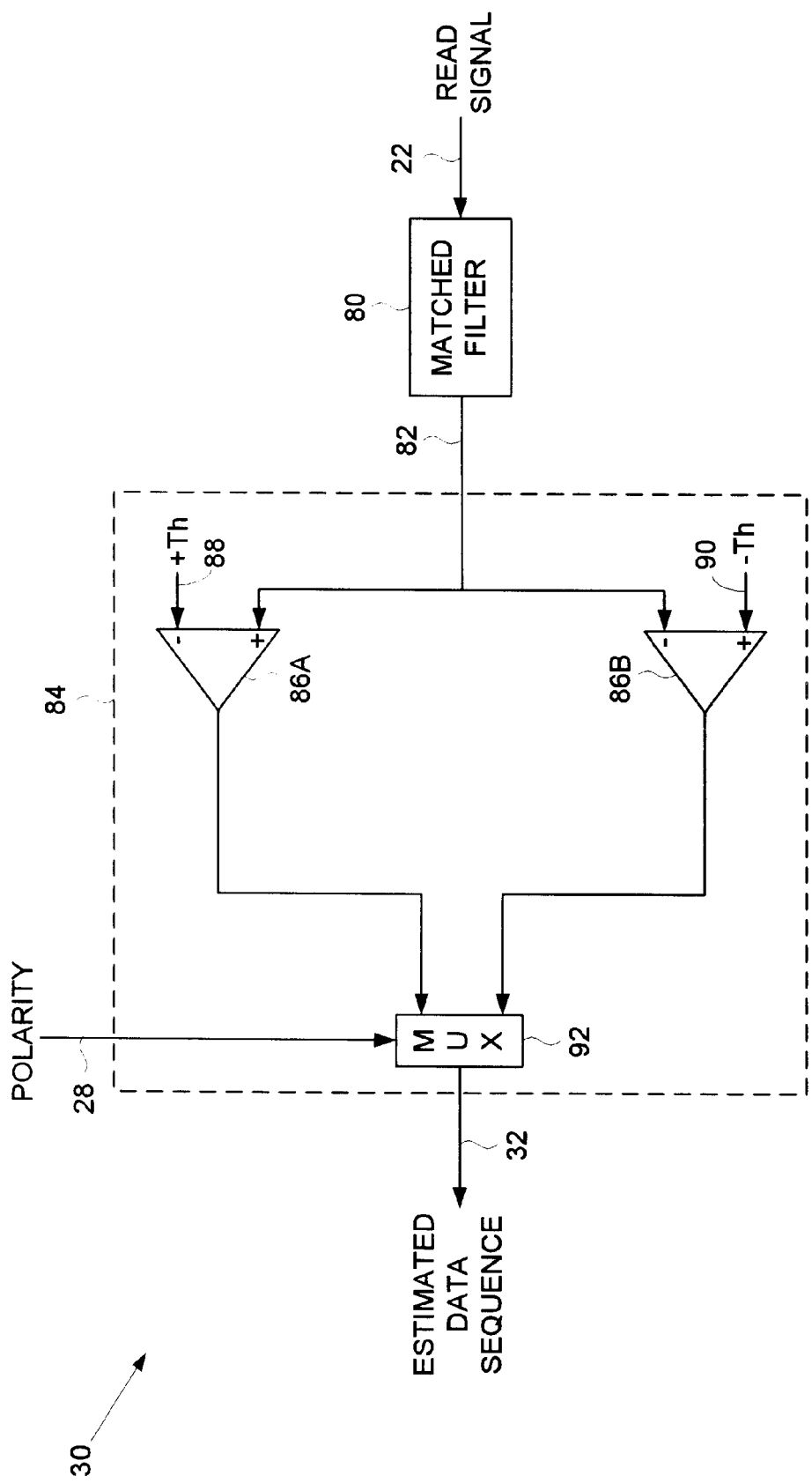
FIG. 5 shows details of a data detector according to an embodiment of the present invention as comprising a matched filter and a programmable threshold configured in response to the polarity signal generated by the sync mark detector.

Any suitable data detector 30 may be employed to detect the estimated data sequence 32 from the read signal 22 using the polarity signal 28. FIG. 5 shows a data detector 30 according to an embodiment of the present invention. In this embodiment, the data stored in the data field of a sector is recorded on the disk in a binary sequence. A "1" bit in the binary sequence is represented by a dibit recorded on the disk 18, the dibit generating a dibit response in the read signal 22, and "0" bit in the binary sequence is represented by the absence of a dibit recorded on the disk 18. The data detector 30 comprises a matched filter 80 (which may be the same matched filter 38 employed in the sync mark detector 24) having an impulse response substantially matched to the dibit response, the matched filter 80 for filtering the read signal 22 to generate a filtered signal 82. A threshold detector 84 compares the filtered signal 82 to a programmable threshold in response to the polarity signal 28. In the embodiment of FIG. 5, the programmable threshold comprises a first comparator 86A for comparing the filtered signal 82 to a positive threshold 88, and a second comparator 86B for comparing the filtered signal 82 to a negative threshold 90. The polarity signal 28 selects via multiplexer 92 the output of the first comparator 86A or the second comparator 86B depending on the expected polarity of the dibit responses representing a "1" bit in the estimated data sequence 32. This enhances performance of the data detector 30 by preventing false detection of "1" bits when the filtered signal 82 exceeds the unselected threshold.

Figure 6:
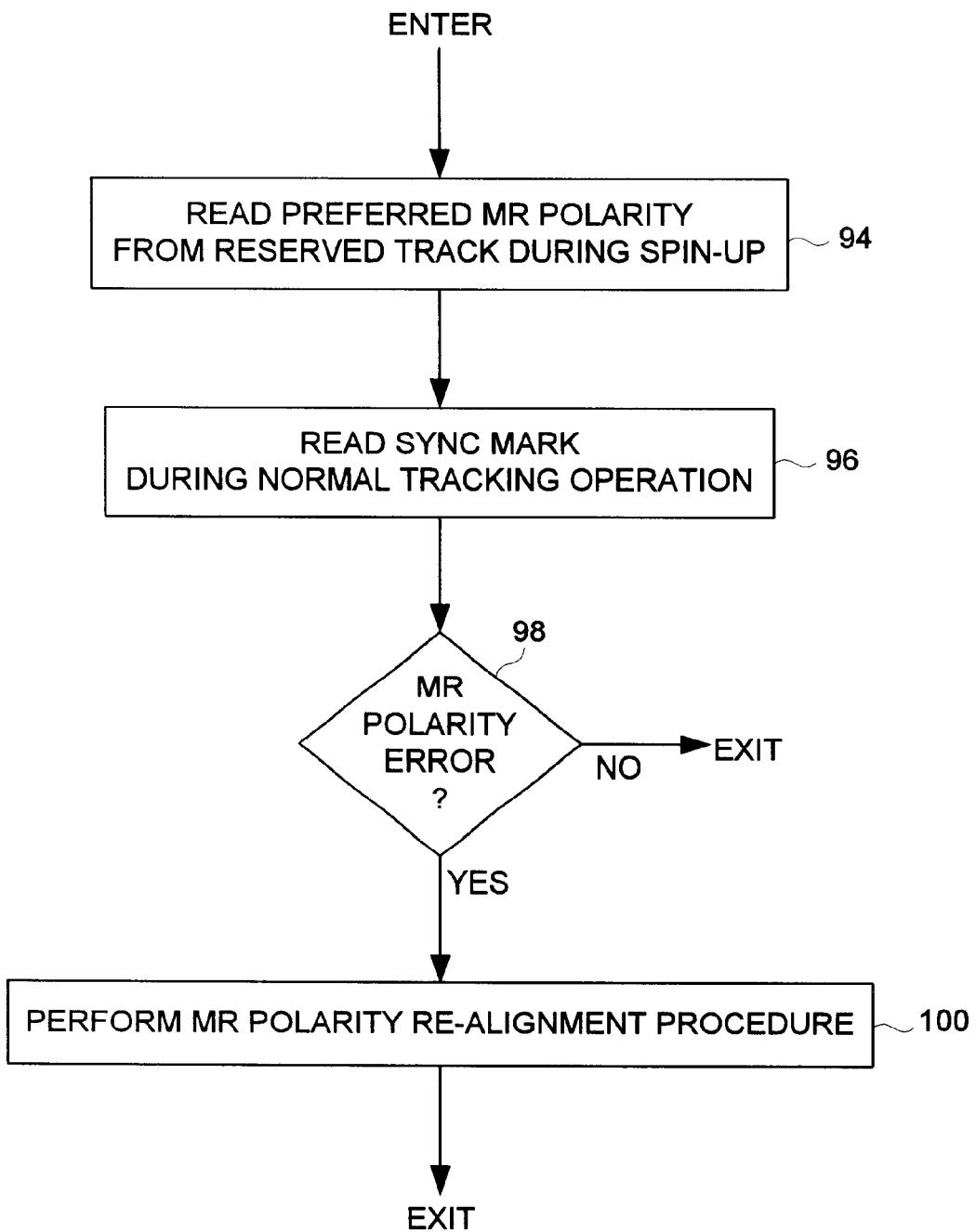
FIG. 6 is a flow diagram according to an embodiment of the invention wherein a polarity of an MR head is reset when a polarity error is detected.

FIG. 6 shows a flow diagram according to another embodiment of the present invention. In this embodiment, the head 20 in the disk drive 16 of FIG. 2 comprises a magnetoresistive (MR) read element having a bias layer magnetizable toward a preferred polarity. The preferred polarity of the bias layer is determined during manufacture of the disk drive 16 and stored on a reserved track on the disk 18. Referring again to FIG. 6, at step 94 the preferred polarity of the MR head 20 is read from the reserved track during spin-up. At step 96, the sync mark pattern is detected by the sync detector 24 during a normal tracking operation (e.g., during a normal read or write operation). The polarity signal 28 generated by the sync mark detector 24 is evaluated at step 98 to determine whether the polarity of the bias layer has deviated from the preferred polarity. If so, at step 100 a polarity re-alignment procedure is executed to re-align the polarity of the bias layer toward the preferred polarity. In one embodiment, the re-alignment procedure comprises the step of increasing a bias current applied to the bias layer for a predetermined interval. In the embodiment of FIG. 2, an adjustable current generator 21 is provided for increasing the bias current for the predetermined interval. Any suitable circuitry may be employed for implementing the adjustable current generator 21.

In one embodiment, the polarity signal 28 indicates when the bias layer has reversed polarity. That is, the polarity signal 28 is a binary signal having only two states. In another embodiment, the polarity signal 28 is a multi-valued signal representing a sensitivity of the bias layer which may decrease in the event of a partial polarity reversal. In this embodiment, the filtered signal 40 output by the matched filter 38 of FIG. 3A may be used to generate the magnitude of the polarity signal 28.

We claim:

1. A disk drive comprising:
    (a) a disk comprising a plurality of data tracks, each data track comprising a plurality of sectors, each sector comprising:
        a preamble field for storing a predetermined periodic data sequence;
        a sync field for storing a predetermined sync mark pattern; and
        a data field for storing data;
    (b) a magnetoresistive (MR) head comprising a MR read element having a bias layer magnetizable toward a preferred polarity, the MR head actuated radially over the disk for generating a read signal;
    (c) a sync mark detector, responsive to the read signal, for detecting the sync mark pattern, wherein when the sync mark pattern is detected the sync detector generates a sync mark detect signal and a polarity signal, the polarity signal indicative of a polarity of the bias layer; and
    (d) a means for modifying the polarity of the bias layer when the polarity signal indicates the polarity of the bias layer has deviated from the preferred polarity.

2. The disk drive as recited in claim 1, wherein the sync mark pattern is recorded on the disk in a binary sequence, a "1" bit in the binary sequence is represented by a dibit recorded on the disk, the dibit generating a dibit response in the read signal, and a "0" bit in the binary sequence is represented by the absence of a dibit recorded on the disk, the sync mark detector comprising:
    (a) a matched filter having an impulse response substantially matched to the dibit response, the matched filter for filtering the read signal to generate a filtered signal;
    (b) a first threshold comparator for comparing the filtered signal to a positive threshold and to a negative threshold, wherein:
        the first threshold detector outputs a first estimated sequence corresponding to the positive threshold;
        the first threshold detector outputs a second estimated sequence corresponding to the negative threshold;
        a "1" bit is detected in the first estimated sequence when the filtered signal exceeds the positive threshold and a "0" bit is detected in the first estimated sequence when the filtered signal does not exceed the positive threshold; and
        a "1" bit is detected in the second estimated sequence when the filtered signal exceeds the negative threshold and a "0" bit is detected in the second estimated sequence when the filtered signal does not exceed the negative threshold;
    (c) a first correlator for correlating the first estimated sequence with the predetermined sync mark pattern to generate a first correlated signal;
    (d) a second correlator for correlating the second estimated sequence with the predetermined sync mark pattern to generate a second correlated signal;
    (e) a second threshold comparator for comparing the first and second correlated signals to a threshold, wherein:
        the sync mark pattern in the read signal is detected when either the first or second correlated signals exceeds the threshold; and
        the polarity signal is generated relative to which correlated signal exceeds the threshold.

3. The disk drive as recited in claim 1, wherein the means for modifying the polarity of the bias layer comprises circuitry for increasing a bias current applied to the bias layer for a predetermined interval.

4. A method of compensating for a polarity error of a bias layer in a magnetoresistive (MR) head deployed in a disk drive, the bias layer magnetizable toward a preferred polarity, the disk drive comprising a disk having a plurality of data tracks, each data track comprising a plurality of sectors, each sector comprising a preamble field for storing a predetermined periodic data sequence, a sync field for storing a predetermined sync mark pattern, and a data field for storing data, the method comprising the steps of:
    (a) detecting the sync mark pattern in a read signal generated by the MR head;
    (b) when the sync mark pattern is detected, generating a sync mark detect signal and a polarity signal, the polarity signal indicative of a polarity of the bias layer; and
    (c) modifying the polarity of the bias layer when the polarity signal indicates the polarity of the bias layer has deviated from the preferred polarity.

5. The method as recited in claim 4, wherein the sync mark pattern is recorded on the disk in a binary sequence, a "1" bit in the binary sequence is represented by a dibit recorded on the disk, the dibit generating a dibit response in the read signal, and a "0" bit in the binary sequence is represented by the absence of a dibit recorded on the disk, wherein the step of detecting the sync mark pattern comprises the steps of:

(a) filtering the read signal with a matched filter having an impulse response substantially matched to the dibit response to generate a filtered signal;

(b) comparing the filtered signal to a positive threshold and to a negative threshold to generate a first estimated sequence corresponding to the positive threshold and a second estimated sequence corresponding to the negative threshold, wherein:

a "1" bit is detected in the first estimated sequence when the filtered signal exceeds the positive threshold and a "0" bit is detected in the first estimated sequence when the filtered signal does not exceed the positive threshold; and a "1" bit is detected in the second estimated sequence when the filtered signal exceeds the negative threshold and a "0" bit is detected in the second estimated sequence when the filtered signal does not exceed the negative threshold;

(c) correlating the first estimated sequence with the predetermined sync mark pattern to generate a first correlated signal;

(d) correlating the second estimated sequence with the predetermined sync mark pattern to generate a second correlated signal;

(e) comparing the first and second correlated signals to a threshold, wherein:

the sync mark detect signal is generated when either the first or second correlated signals exceeds the threshold; and the polarity signal is generated relative to which correlated signal exceeds the threshold.

6. The method as recited in claim 4, wherein the step of modifying the polarity of the bias layer comprises the step of increasing a bias current applied to the bias layer for a predetermined interval.

* * * * *